United States Patent
Johnston

(10) Patent No.: US 7,724,893 B2
(45) Date of Patent: May 25, 2010

(54) METHOD OF ADAPTATION STEP CONTROL IN ECHO CANCELLERS

(75) Inventor: Renee Johnston, Dunrobin (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1330 days.

(21) Appl. No.: 11/196,624

(22) Filed: Aug. 3, 2005

(65) Prior Publication Data

US 2006/0029214 A1 Feb. 9, 2006

(30) Foreign Application Priority Data

Aug. 4, 2004 (GB) .............................. 0417375.3

(51) Int. Cl.
H04M 9/08 (2006.01)

(52) U.S. Cl. ............................................. 379/406.08

(58) Field of Classification Search .......... 379/338–418
See application file for complete search history.

(56) References Cited

U.S. PATENT DOCUMENTS

| | | | | |
|---|---|---|---|---|
| 5,307,405 | A * | 4/1994 | Sih .................... | 379/406.08 |
| 5,577,097 | A | 11/1996 | Meek ................. | 279/3 |
| 5,631,900 | A | 5/1997 | McCaslin et al. .... | 370/287 |
| 5,745,564 | A | 4/1998 | Meek ................. | 379/410 |
| 6,351,532 | B1 | 2/2002 | Takada et al. | |
| 6,768,723 | B1 | 7/2004 | Popovic et al. ...... | 370/287 |
| 2003/0235312 | A1* | 12/2003 | Pessoa et al. ....... | 381/66 |
| 2005/0169457 | A1* | 8/2005 | Johnston et al. .... | 379/406.08 |

FOREIGN PATENT DOCUMENTS

| | | |
|---|---|---|
| CA | 2414636 | 6/2004 |
| EP | 0604870 | 6/1994 |
| EP | 0 661 832 A2 | 7/1995 |
| EP | 0 661 832 A3 | 7/1995 |
| EP | 1367736 | 3/2003 |

OTHER PUBLICATIONS

Casco, et al., "A Two Step Size NLMS Adaptive Filter Algorithm", Singapore ICCS '94 Conference Proceedings. Singapore Nov. 14-18, 1994, New York, NY, USA, IEEE, US, vol. 2, Nov. 14, 1994, pp. 814-819.

Nino-de-Rivera et al., "A Modular Analog NLMS Structure for System Identification", Circuits and Systems, 1997. Proceedings of the 40th Midwest Symposium on Sacramento, CA, USA Aug. 3-6, 1997, New York, NY, USA, IEEE, US, vol. 2, Aug. 3, 1997, pp. 835-840.

Kim et al., "Performance Analysis of the Adjusted Step Size NLMS Algorithm", System Theory, 2004. Proceedings of the Thirty-Sixth Southeastern Symposium on Atlanta, GA, USA, Mar. 14-16, 2004, Piscataway, NJ, USA, IEEE, Mar. 14, 2004, pp. 467-471.

* cited by examiner

Primary Examiner—Alexander Jamal

(57) ABSTRACT

A method is set forth for calculating an expected Echo Return Loss Enhancement (ERLE) in an echo canceller. The expected ERLE is used to control the adaptation step of an adaptive filter in the echo canceller. Also, a novel echo canceller is set forth where the adaptation step of its adaptive filter is controlled based on the expected ERLE.

7 Claims, 2 Drawing Sheets

METHOD OF ADAPTATION STEP CONTROL IN ECHO CANCELLERS

FIELD OF THE INVENTION

The present invention relates generally to echo cancellers, and more particularly to a method of evaluating the expected level of achievable Echo Return Loss Enhancement (ERLE), controlling the adaptation step of an adaptive filter using the expected ERLE compared to current ERLE given by the adaptive coefficients of the filter.

BACKGROUND OF THE INVENTION

The signal path between two telephones, involving a call other than a local one, requires amplification using a four-wire circuit. The cost and cabling required discourages extending a four-wire trunk circuit to a subscriber's premises from the local exchange. For this reason, the four-wire trunk circuits are coupled to two-wire local circuits, using a device called a hybrid.

Hybrid echo, the primary source of echo generated from the public-switched telephone network (PSTN) is created as voice signals are transmitted across the network via the hybrid connection at the two-wire/four-wire PSTN conversion points.

Unfortunately, the hybrid is by nature a leaky device. As voice signals pass from the four-wire to the two-wire portion of the network, the energy in the four-wire section is reflected back, creating an echo of the speech signal. Provided that the total round-trip delay occurs within just a few milliseconds, the echo results in a user perception that the call is 'live' by adding sidetone, thereby making a positive contribution to the quality of the call.

In cases where the total network delay exceeds 36 ms, however, the positive benefits disappear, and intrusive echo results. The actual amount of signal that is reflected back depends on how well the balance circuit of the hybrid matches the two-wire line. In the vast majority of cases, the match is poor, resulting in a considerable level of signal being reflected back.

The effective removal of hybrid echo is one key to maintaining and improving perceived voice quality on a call. This has led to intensive research into the area of echo cancellation, with the aim of providing solutions that can reduce echo from hybrids. By employing the results of this research, the overall speech quality has significantly improved.

It is known in the art to employ adaptive filtering to address hybrid echo cancellation. In Normalized Least Mean Square (NLMS) adaptive filtering, adaptive filter coefficients are used to map the hybrids in the signal path. Using these coefficients, the NLMS adaptive filter cancels signal reflections from the hybrids in the signal path. To adapt and stabilize the adaptive coefficients so that the Echo Return Loss Enhancement (ERLE) is maximized for all hybrids, the adaptation step of the NLMS algorithm is varied.

Under ideal conditions, a generally acceptable convergence time requires that the echo canceller achieve 27 dB of ERLE (Echo Return Loss Enhancement) in 0.5 sec. Once the coefficients are converged, the echo is canceled from the input signal.

It is an object of an aspect of the present invention to minimize the convergence time of the adaptive filter for different hybrids in the signal path and to obtain as much ERLE possible under different line conditions.

SUMMARY OF THE INVENTION

According to the present invention, information on the level of energy in the reference signal (Rin), the noise level on the input signal (Sin), and the estimated Echo Return Loss (ERL) is used to evaluate an expected level of achievable Echo Return Loss Enhancement (ERLE). The adaptation step of the NLMS algorithm is then controlled based on a comparison of the expected ERLE to the current ERLE given by the adaptive coefficients.

BRIEF DESCRIPTION OF THE DRAWINGS

An embodiment of the present invention will now be described, by way of example only, with reference to the attached Figures, wherein.

DETAILED DESCRIPTION OF THE INVENTION

Figure 1:
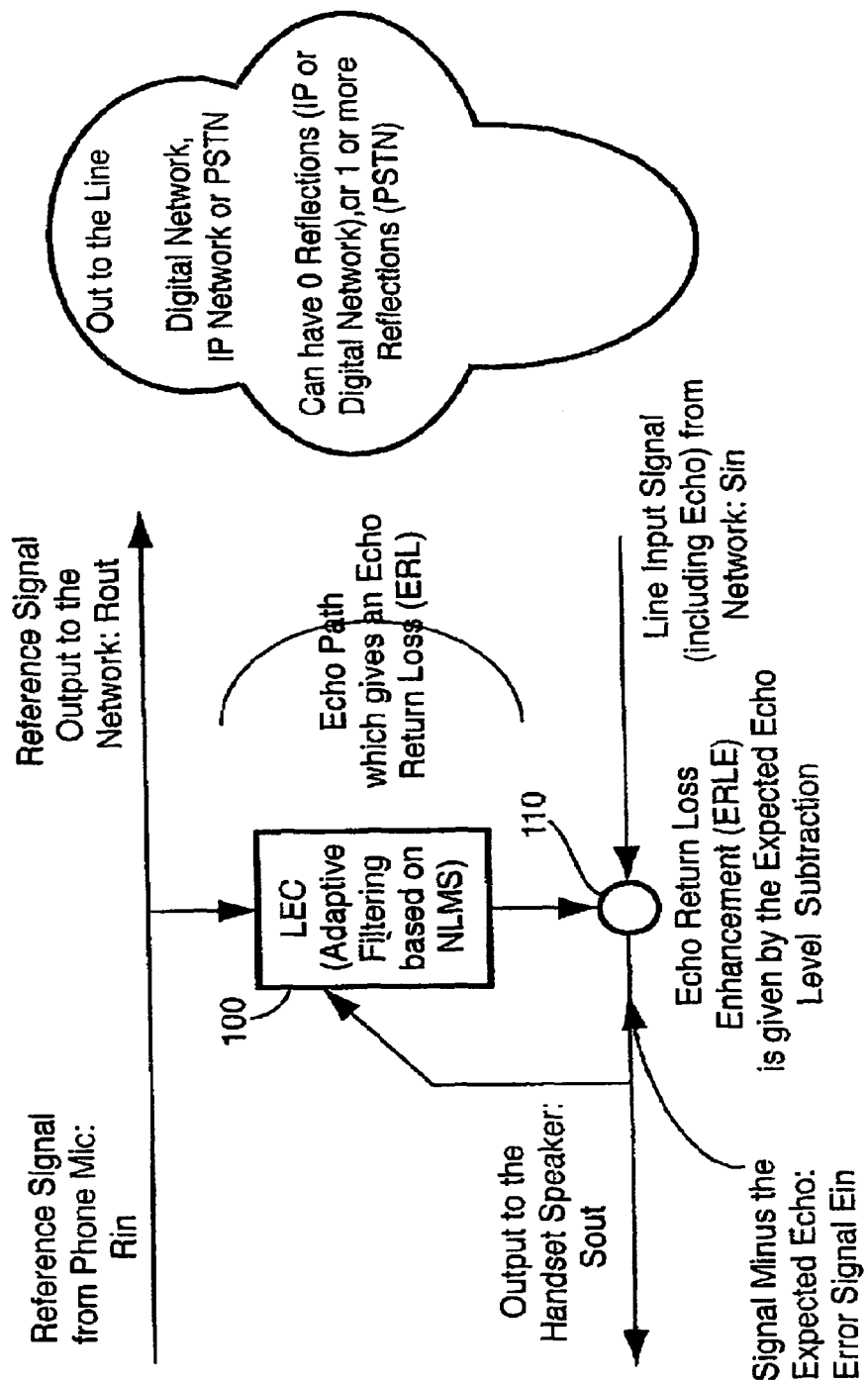
FIG. 1 is a schematic representation of an echo canceller according to the prior art.

According to the prior art system of FIG. 1, a reference signal (Rin) is applied to an input of echo canceller 100 and to the echo path (i.e. the network echo path resulting from line impedance mismatch) as Rout. The echo path gives rise to an Echo Return Loss (ERL), which is a measure of the actual amount of reflected signal. A high ERL indicates only a relatively small signal reflected back to the talker, and vice versa. The echo canceller 100 models an estimation of the echo introduced by the echo path using the well known NLMS algorithm (although other adaptive algorithms may be used), and subtracts the echo signal from the Line Input Signal (Sin) which contains the undesirable echo, via a subtractor 110. Provided that the transfer function of the model of the echo path provided by echo canceller 100 is identical to the transfer function of the echo path, the error signal becomes zero and the echo canceller 100 converges to the correct transfer function, resulting in perfect echo cancellation. Echo Return Loss Enhancement (ERLE) is given by the expected echo level subtraction, and is an indicator of the amount of echo removed by an echo canceller.

Echo Return Loss Enhancement (ERLE) is defined as:

$$ERLE(dB) = 10 \log_{10}[\text{Power}(Sin)/\text{Power}(Ein)].$$

Depending on the type of hybrid and some other conditions such as noise on the lines, the ERLE that the NLMS algorithm can provide will vary. This is the result of the background Noise Level on the line interface, which limits the total ERL+ERLE. For example, in a hybrid that gives a wideband ERL of 10 dB, it may be possible to obtain an ERLE of 30 db whereas with a 27 db ERL, it might only be possible to obtain 13 dB of ERLE. The expected ERLE is also dependant on the level of the reference signal (Rin) and the level of the noise on the Input signal (sin). Depending on the Reference Signal (Rin), we can cancel its echo down to the noise level of the input signal (Sin). A louder reference signal gives rise to a louder echo allowing the adaptive coefficients to provide more ERLE.

Figure 2:
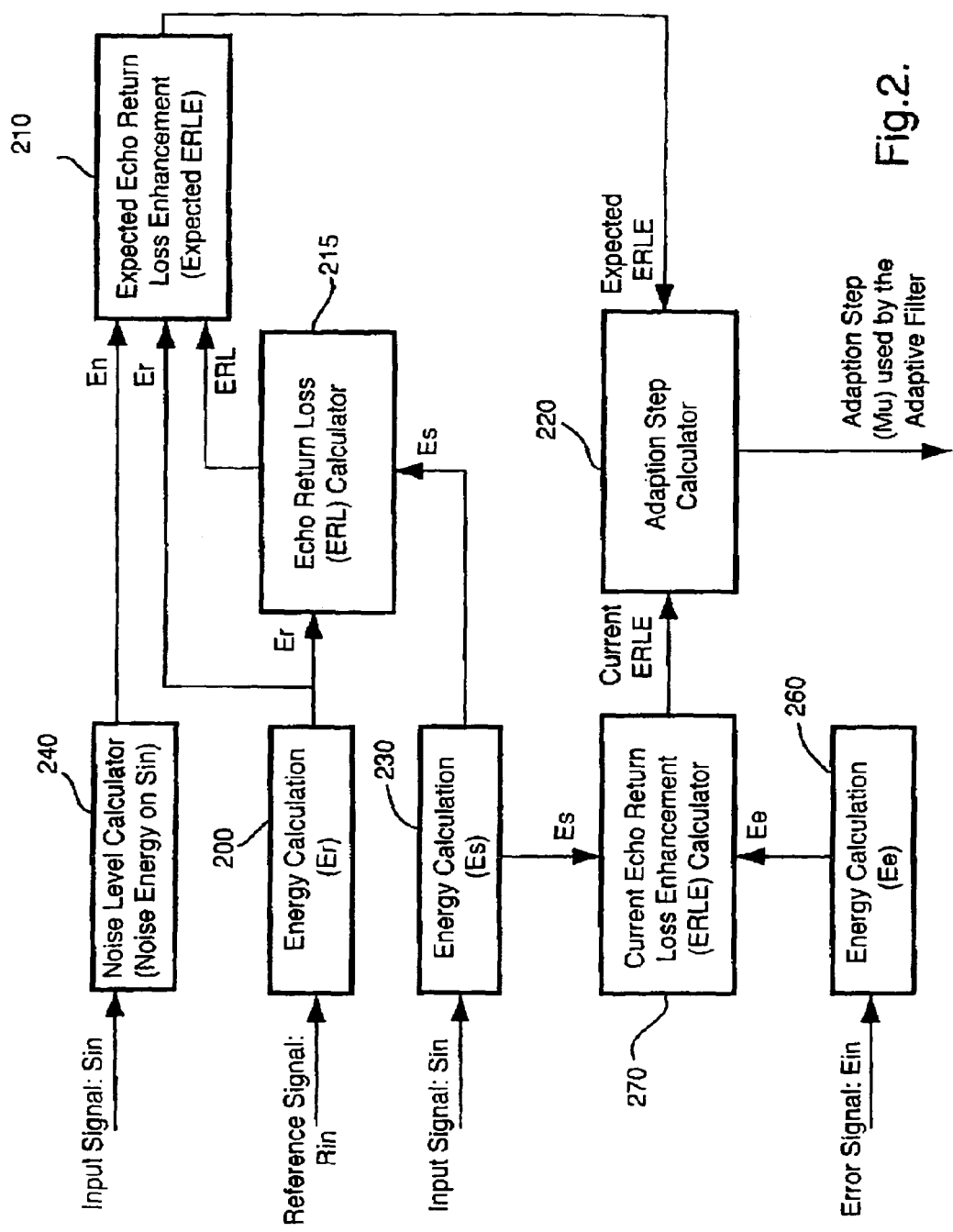
FIG. 2 is a schematic representation of an adaptation step calculator for use with the echo canceller of FIG. 1, according to the present invention.

Turning now to FIG. 2, an adaptation step calculator is shown according to the preferred embodiment. Reference signal (Rin) is applied to an energy calculation block 200, whose output (Er) is sent to the input of a block 210 for estimating the expected ERLE and to a block 215 for calculating the Echo Return Loss (ERL).

The input signal (Sin) is applied to a further energy calculation block 230, whose output (Es) is connected to a further input of ERL calculator 215, and to an input of current Echo Return Loss Enhancement (ERLE) calculator 270. The input signal (Sin) is also applied to a noise level calculator 240, whose output (En) is connected to another input of block 210. The error signal (Ein) output from subtractor 110 (FIG. 1) is connected to a further energy calculator 260, whose output (Ee) is connected to the second input of block 270.

The output of block 270 (Current ERLE) is connected to a first input, and the output of block 210 (Expected ERLE) is connected to a second input of an adaptation step block 220, whose output (Mu) is used to control the adaptation rate of filter 100 (FIG. 1).

While the echo canceller is running, the expected ERLE is updated via block 210 on a per-sample basis as follows:

$$ERLE_{expected} = Er/(EnergyNoise * ERL),$$

where Er is the energy of the reference signal (Rin),
ERL is evaluaged using the ERL Calculator 215, and
EnergyNoise is the noise Energy on Sin evaluated by noise level calculator 240.

The current ERLE is evaluated in block 270 as follows:

$$ERLE_{current} = Es/Ee,$$

where Es is the Energy of the Input Signal (Sin) and Ee is the Energy of the error signal (ein).

The adaptation step (Mu) of the NLMS algorithm is then reduced depending on the difference between the current ERLE (db) and the expected ERLE (db). When ERLE_current is low compared to the expected ERLE, a big step is used to adapt the coefficients. When ERLE_current is close to the expected ERLE, the step size is reduced to provide greater stability and to obtain more precision with the adaptive coefficients.

For example:
If (ERLE_current(in dB)>ERLE_expected (in dB)*Stage1_ERLEFactor)
Then Mu=Mu*MuRedFactorMin;
If (ERLE_current (in dB)>=ERLE_expected (in dB))
Then Mu=Mu*MuRedFactorMax.

Typical values for these constants are: Stage1_ERLEFactor=0.5, MuRedFactorMin=0.5 and MuRedFactorMax=0.25, resulting in a reduction in adaptation step useful for maximizing the convergence level for all types of hybrid.

It will be appreciated that, although embodiments of the invention have been described and illustrated in detail, various modifications and changes may be made. Different implementations may be made by those familiar with the art, without departing from the scope of the invention.

What is claimed is:

1. A method of controlling rate of adaptation of an adaptive filter in an echo canceller, having both hardware and software components, to accommodate different hybrids connected thereto, comprising:
    calculating an expected Echo Return Loss Enhancement (ERLE) for said echo canceller;
    calculating current ERLE of an input signal (Sin) applied to said echo canceller;
    determining if the current ERLE is greater than the expected ERLE multiplied by a constant (Stage1 ERLE-Factor), then adjusting the adaptation step (mu) to Mu=Mu*MuRedFactorMin, and if the current ERLE is greater than or equal to the expected ERLE, then adjusting the adaptation step (Mu) to Mu=Mu*MuRedFactorMax; and
    one of either (i) increasing the adaptation step of said adaptive filter in the event the difference between the current ERLE and the expected ERLE is greater than a predetermined amount, or (ii) decreasing said adaptation step in the event said difference is less than said predetermined amount.

2. The method of claim 1, wherein said calculating current ERLE of said input signal further comprises calculating total energy (Es) of said input signal (Sin) and energy (Ee) of an output signal (ein) from said echo canceller, and dividing said energy (Es) by said energy (Ee).

3. The method of claim1, wherein Stage1_ERLEFactor=0.5, MuRedFactorMin=0.5 and MuRedFactorMax=0.25.

4. An echo canceller having both hardware and software components, comprising:
    a first energy calculator for receiving a reference signal (Rin) and calculating energy (Er) thereof;
    an expected ERLE estimator and current ERLE calculator for calculating ERLE_expected and ERLE_current, respectively:
    an adaptation step calculator;
    an adaptive filter connected to said adaptation step calculator for controlling rate of adaptation of filter coefficients thereof;
    an ERL calculator for calculating the ERL of an input signal (Sin);
    a noise level calculator connected to said ERLE estimator, for calculating noise energy (EnergyNoise) in said input signal;
    a second energy calculator for calculating total energy in said input signal (Sin);
    a subtractor for subtracting from said input signal (Sin) the signal output from said adaptive filter, and
    a third energy calculator for calculating energy (Ee) in the signal output from said subtractor and in response outputting an error signal (ein),
    wherein, one of either (i) increasing the adaptation step of said adaptive filter in the event a difference between the current ERLE and the expected ERLE is greater than a predetermined amount, or (ii) decreasing said adaptation step in the event said difference is less than said predetermined amount.

5. The method of claim 4, wherein said step expected ERLE estimator and current ERLE calculator operate and wherein said calculating ERIE current of said input signal further comprises calculating total energy (Es) of said input signal (Sin) and energy (Ee) of an output signal (ein) from said echo canceller, and dividing said energy (Es) by said energy (Ee).

6. The echo canceller of claim 4, wherein said adaptation step calculator operates and wherein the step of one of either increasing or decreasing said adaptation step further comprises:
    determining if the current ERLE is greater than the expected ERLE multiplied by a constant (Stage1_ERLEFactor), then adjusting the adaptation step (mu) to Mu=Mu*MuRedFactorMin, and if the current ERLE is greater than or equal to the expected ERLE, then adjusting the adaptation step (Mu) to Mu=Mu*MuRedFactorMax.

7. The echo canceller of claim 4, wherein said adaptation step calculator operates and wherein Stage1_ERLEFactor=0.5, MuRedFactorMin=0.5 and MuRedFactorMax=0.25.

* * * * *

UNITED STATES PATENT AND TRADEMARK OFFICE
CERTIFICATE OF CORRECTION

PATENT NO. : 7,724,893 B2  Page 1 of 1
APPLICATION NO. : 11/196624
DATED : May 25, 2010
INVENTOR(S) : Johnston It is certified that error appears in the above-identified patent and that said Letters Patent is hereby corrected as shown below:

Claim 5, Line 3, "calculating ERIE" should be "calculating ERLE"

Signed and Sealed this

Third Day of August, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,724,893 B2 | |
| APPLICATION NO. | : 11/196624 | |
| DATED | : May 25, 2010 | |
| INVENTOR(S) | : Johnston | |

It is certified that error appears in the above-identified patent and that said Letters Patent is hereby corrected as shown below:

Column 4, line 46 (Claim 5, Line 3), "calculating ERIE" should be "calculating ERLE"

This certificate supersedes the Certificate of Correction issued August 3, 2010.

Signed and Sealed this

Twenty-fourth Day of August, 2010

David J. Kappos
*Director of the United States Patent and Trademark Office*